US012469343B2

United States Patent
Saito

(10) Patent No.: US 12,469,343 B2
(45) Date of Patent: Nov. 11, 2025

(54) VEHICULAR DISPLAY DEVICE

(71) Applicant: Nippon Seiki Co., Ltd., Niigata (JP)

(72) Inventor: Ryuji Saito, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 65 days.

(21) Appl. No.: 18/734,291

(22) Filed: Jun. 5, 2024

(65) Prior Publication Data
US 2024/0420525 A1    Dec. 19, 2024

(30) Foreign Application Priority Data

Jun. 19, 2023 (JP) ................. 2023-100001

(51) Int. Cl.
G07C 5/08 (2006.01)
G06F 12/02 (2006.01)

(52) U.S. Cl.
CPC ......... G07C 5/085 (2013.01); G06F 12/0246 (2013.01)

(58) Field of Classification Search
CPC ....... G07C 5/085; G06F 12/0246; B60R 1/00; B60K 35/22; B60K 35/81
See application file for complete search history.

(56) References Cited

U.S. PATENT DOCUMENTS

| 2015/0194124 A1* | 7/2015 | Yamauchi | B60K 35/10 345/211 |
| 2016/0334853 A1* | 11/2016 | Ono | G06F 1/3231 |
| 2022/0011842 A1* | 1/2022 | Reddy | G06F 11/0793 |
| 2022/0408218 A1* | 12/2022 | Tillgren | G06Q 50/08 |
| 2023/0386552 A1* | 11/2023 | Ji | G11C 11/40615 |

FOREIGN PATENT DOCUMENTS

JP    2016175617 A  * 10/2016

* cited by examiner

*Primary Examiner* — Ramon A. Mercado
(74) *Attorney, Agent, or Firm* — Rimon P.C.

(57) ABSTRACT

To provide a vehicular display device capable of reducing the number of times save vehicle information is written into a nonvolatile memory. When a vehicle travel end operation is performed, an turns off a first power supply circuit and a second power supply circuit and performs data saving processing before shifting to a power saving mode. In the data saving processing, a part of vehicle information stored in a RAM is separated to be separately stored in a ROM and an in-core RAM (included in an internal memory of a second processor core) to which power is constantly supplied, as save-required-data (save vehicle information).

3 Claims, 3 Drawing Sheets

VEHICULAR DISPLAY DEVICE

CROSS-REFERENCE TO RELATED APPLICATIONS

This application claims benefit of foreign priority to Japanese Patent Application No. 2023-100001 filed on Jun. 19, 2023, and the entire contents of each of which are hereby incorporated by reference.

TECHNICAL FIELD

The present disclosure relates to a vehicular display device.

BACKGROUND ART

Patent Document 1 discloses a vehicular display device which is shifted to a power-saving suspended mode when an ignition switch is turned off. In the vehicular display device, vehicle information, such as a total travel distance and a fuel efficiency history of the past stored in a volatile working memory (i.e., a RAM), is saved in a nonvolatile memory such as an EEPROM at end processing which is conducted before the vehicular display device enters the suspended mode.

PRIOR ART DOCUMENT

Patent Document

Patent Document 1: Japanese Unexamined Patent Application Publication No. 2016-175617

SUMMARY OF INVENTION

Technical Problem

However, in a nonvolatile memory such as an EEPROM, when the number of writes to be made exceeds a guaranteed number, the possibility of data not being able to be stored correctly increases. Therefore, there has been a demand for reducing the number of writes to be made in the data saving.

In view of the above-described problem, an object of the present disclosure is to provide a vehicular display device capable of reducing the number of times save vehicle information is written into a nonvolatile memory.

Solution to Problem

A vehicular display device of the present disclosure pertains to a vehicular display device provided with a volatile working memory which stores vehicle information; and a control unit which causes the vehicle information stored in the working memory to be displayed on a display, in which the vehicular display device includes: a nonvolatile first save memory; a volatile second save memory whose capacity is smaller than a capacity of the first save memory; an on/off power supply which supplies power to the first save memory, the working memory, and the display, and is capable of turning on or off the power supply thereto; and an always-on power supply which constantly supplies power to the second save memory, and the vehicular display device is characterized in that when a vehicle travel end operation is performed, the control unit turns off the on/off power supply and performs data saving processing before shifting to a power saving mode, and in the data saving processing, a part of the vehicle information stored in the working memory is separated to be separately stored in the first save memory and the second save memory as save vehicle information.

Advantageous Effects of Invention

According to the present disclosure, it is possible to provide a vehicular display device capable of reducing the number of times save vehicle information is written into a nonvolatile memory.

DESCRIPTION OF EMBODIMENTS (Configuration of Vehicular Display Device)

A vehicular display device M is an instrument which displays vehicle information to a person on board a vehicle. The vehicular display device M is mounted on an instrument panel of the vehicle.

The vehicle information is information such as a traveling speed of the vehicle, an engine speed, a vehicle automatic control state, a warning lamp, a residual fuel amount (residual energy amount), a tire air pressure, route guidance, video of a vehicle-mounted camera, a total travel distance, an elapsed time, average fuel efficiency, instantaneous fuel efficiency, and setting data. The elapsed time includes, for example, time elapsed from the previous maintenance.

The vehicle automatic control state refers to an operating state of an automated driving mode in which the vehicle automatically controls the acceleration/deceleration and steering of the vehicle. Examples of the automated driving mode include an auto-pilot mode in which the vehicle travels at a constant speed with an inter-vehicular distance from a vehicle ahead being kept constant, an auto-lane change mode in which the vehicle controls the steering to make a lane change when the driver operates a direction indicator, an auto-park mode in which the vehicle is moved to and parked at a space determined by the vehicle as being a space where the vehicle can be parked, and the like.

Figure 1:
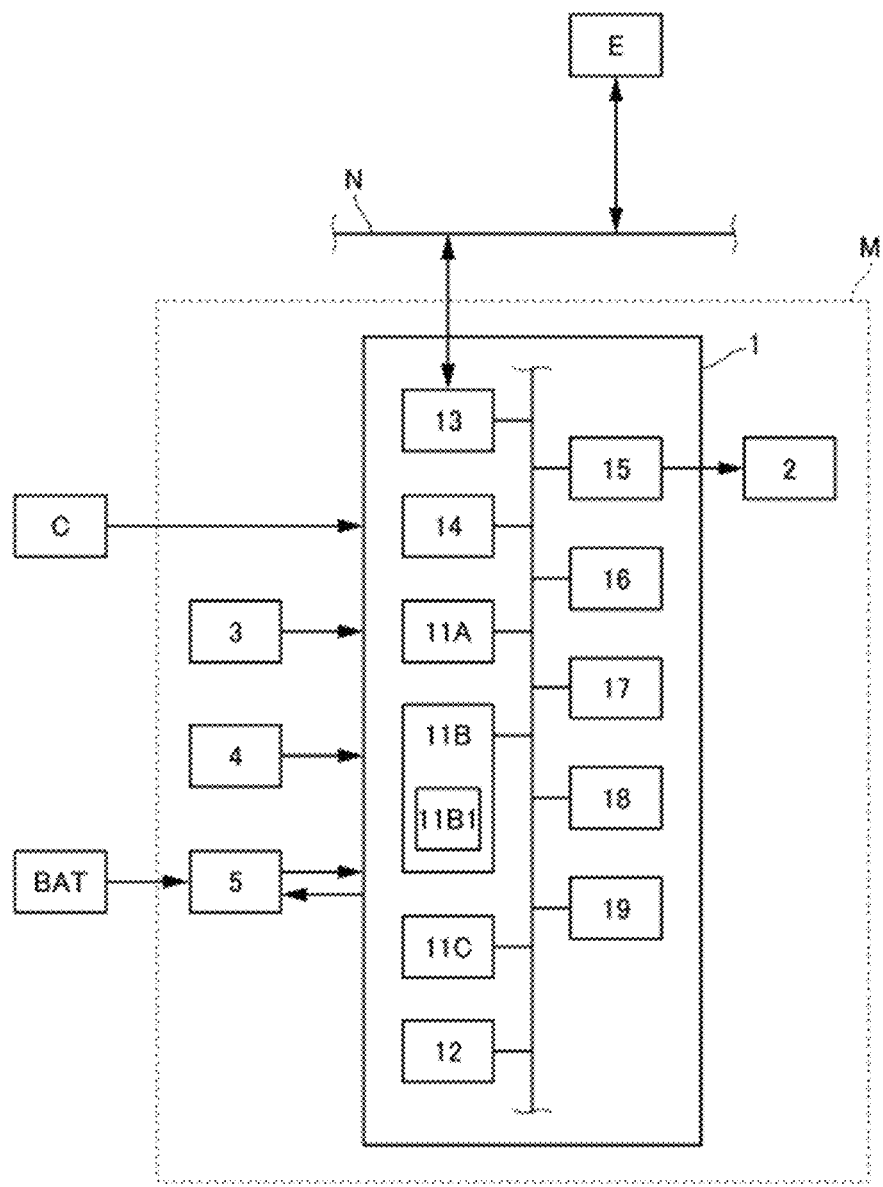
FIG. 1 is a diagram illustrating a system configuration of a vehicular display device.

As illustrated in FIG. 1, the vehicular display device M is provided with a System-on-a-Chip (SOC) 1, a display 2, a timer unit 3, a reset circuit 4, and a power supply circuit 5.

The SOC 1 is an integrated semiconductor chip in which all of the functions necessary for the operation of the vehicular display device M are mounted on a single integrated circuit chip. The functions necessary for the operation of the vehicular display device M correspond to a function (an instrument display function) of enabling display of the vehicle information on the display 2. The SOC 1 acquires a video signal obtained by capturing an image of the surroundings of the vehicle from a vehicle-mounted camera C, which captures the images of the surroundings of the vehicle, and causes the display 2 to perform a display, if needed. In addition, the SOC 1 causes the vehicle information, which has been acquired from a vehicle-mounted control unit E via an in-vehicle network N, to be displayed on the display 2. Details of the SOC 1 will be described later.

The display 2 is a device which displays an image, such as a liquid crystal display or an organic EL display. The display 2 inputs a video signal which has been output from the SOC 1 and displays, on a screen, an image based on the video signal.

The timer unit 3 is a real-time clock (RTC) integrated circuit (IC) which constantly performs time measurement, and transmits the measured date and time information to the SOC 1 (more specifically, a second processor core 11B, which will be described later). The date and time information is used in order to calculate, for example, "time elapsed from the previous maintenance" for notifying "the next oil change timing" or the like. In order to constantly perform the time measurement, the timer unit 3 is constantly supplied with power from a third power supply circuit 53 (i.e., an always-on power supply), which will be described later, and is operated.

The reset circuit 4 is a reset IC which outputs a reset signal for activating (reactivating) the SOC 1. The reset circuit 4 outputs a reset signal to the SOC 1 and activates the SOC 1 when an output voltage of a first power supply circuit 54, which will be described later, reaches a predetermined voltage (e.g., 5.0 V). The activation processing of the SOC 1 by the reset circuit 4 will be described later.

The power supply circuit 5 transforms the voltage of battery power of about 7 to 12 V, which is supplied from a vehicle-mounted battery BAT, and supplies the power to the SOC 1, the display 2, the timer unit 3, and the reset circuit 4. Details of the power supply circuit 5 will be described later.

(Configuration of SOC)

As illustrated in FIG. 1, the SOC 1 incorporates therein a first processor core 11A, the second processor core 11B, a third processor core 11C, a Process-Voltage-Temperature (PVT) monitoring unit 12, a communication unit 13, a video input unit 14, a display control unit 15, a ROM 16, a RAM 17, a 2D rendering unit 18, and a 3D rendering unit 19.

The first processor core 11A is an arithmetic device which functions independently of and separately from the other cores.

The first processor core 11A is operated by execution of first processor core software. The first processor core software includes a first boot loader, an operating system (OS), normal screen rendering software, update function software, normal screen rendering image data, and normal screen rendering audio data.

The first boot loader loads the first processor core software stored in the ROM 16 into the RAM 17, so that the first processor core 11A is enabled to execute the first processor core software. The first boot loader has the function of verifying the integrity of the first processor core software during or after the loading of the first processor core software. For the verification of the integrity, for example, a digital signature technique such as an Elliptic Curve Digital Signature Algorithm (ECDSA) is used to check whether the first processor core software is not defective, i.e., is not falsified, for example.

The OS is basic software for executing the normal screen rendering software and the update function software. As the OS, a Linux OS, for example, is used.

The normal screen rendering software is an application program which operates on the OS.

In a normal display mode, which will be described later, the normal screen rendering software renders an image representing the vehicle information in a corresponding area of the RAM 17 in order to display a normal screen by the 3D rendering on the display 2.

The update function software is an application program which operates on the OS. The update function software is a program for updating the software of each of the processor cores 11A, 11B, and 11C.

The normal screen rendering image data and the normal screen rendering audio data are data used by the normal screen rendering software to render a normal screen.

The second processor core 11B is an arithmetic device which functions independently of and separately from the other cores. The second processor core 11B incorporates therein an internal memory 11B1. The internal memory 11B1 includes an in-core ROM and an in-core RAM. The second processor core 11B loads a program stored in the in-core ROM into the in-core RAM and starts the operation. The capacity of the in-core RAM is smaller than that of the ROM 16.

The second processor core 11B is a secure processor core which decrypts an encrypted instruction code and executes the decrypted instruction code. The second processor core 11B includes a core-specific key storage unit which stores a specific key (a core-specific key). The in-core ROM of the internal memory 11B1 stores an encrypted program in a non-rewritable form. The second processor core 11B authenticates the encrypted instruction code for the program stored in the in-core ROM using the core-specific key, decrypts the encrypted instruction code, and executes the program.

The second processor core 11B loads second processor core software stored in the in-core ROM or the ROM 16 into the in-core RAM or the RAM 17 and executes the second processor core software. The second processor core software includes a second boot loader and communication software.

The second boot loader is a program stored in the in-core ROM, and is activated in a state where the integrity is ensured. When the second boot loader is activated, the second boot loader verifies the integrity of the first boot loader and a third boot loader, which will be described later. Also, the second boot loader loads the communication software from the ROM 16, and verifies the integrity of the communication software. The verification method used in the verifications mentioned above is the same as that of the first boot loader, for example.

The communication software is a program for performing communication with a vehicle-mounted device via the communication unit 13. The communication software acquires, for example, the vehicle information such as the traveling speed and engine speed of the vehicle from a vehicle-mounted ECU.

The third processor core 11C is an arithmetic device which functions independently of and separately from the other cores.

The third processor core 11C is operated by execution of third processor core software. The third processor core software includes a third boot loader, activation screen rendering software, activation screen rendering image data, and activation screen rendering audio data.

The third boot loader loads the third processor core software stored in the ROM 16 into the RAM 17, so that the third processor core 11C is enabled to execute the third processor core software. The third boot loader has the function of verifying the integrity of the third processor core software during or after the loading of the third processor core software. The above verification method is the same as that of the second boot loader, for example.

In an activation display mode, the activation screen rendering software renders an image representing the vehicle information in a corresponding area of the RAM 17 in order to display an activation screen by the 2D rendering on the display 2.

Further, in an emergency display mode, the activation screen rendering software renders an image representing the vehicle information and a warning message in a corresponding area of the RAM 17 in order to display a replacement screen by the 2D rendering on the display 2.

The activation screen rendering image data and the activation screen rendering audio data are data used by the activation screen rendering software to render the activation screen or the replacement screen.

The PVT monitoring unit 12 is a functional block which monitors whether the operation of each of the processor cores 11A to 11C is normal or not. The PVT monitoring unit 12 monitors whether a source voltage supplied to each of the processor cores 11A to 11C and the operation clock are normal. Further, the PVT monitoring unit 12 monitors whether the temperature of each of the processor cores 11A to 11C is within an operation guarantee range or not.

The communication unit 13 is a functional block which performs communication in conformity with a predetermined communication protocol. The predetermined communication protocol is, for example, Controller Area Network (CAN), Local Interconnect Network (LIN), Media Oriented Systems Transport (MOST), Ethernet, or the like. The communication unit 13 communicates with the vehicle-mounted control unit E via the in-vehicle network N, acquires the vehicle information, and stores the acquired vehicle information in the RAM 17.

The video input unit 14 is a functional block which inputs a video signal of a predetermined standard. The video signal of a predetermined standard refers to a signal of the standard such as the National Television System Committee (NTSC), Low Voltage Differential Signaling (LVDS), High-Definition Multimedia Interface (HDMI (registered trademark)), or the like. The video input unit 14 inputs a video signal obtained by capturing an image of the surroundings of the vehicle from the vehicle-mounted camera C, and stores the video signal in the RAM 17.

The display control unit 15 is a functional block which outputs the video signal of a predetermined standard to the display 2 and causes the display 2 to display an image representing the vehicle information. The video signal of a predetermined standard refers to a signal of the standard such as the LVDS, HDMI (registered trademark), or the like.

The ROM 16 is a rewritable nonvolatile memory, and is, for example, a NAND flash memory or a NOR flash memory.

The RAM 17 is a volatile memory, and is, for example, a double data rate synchronous dynamic random access memory (DDRSDRAM) which transfers data by a double data rate (DDR) method. The RAM 17 is a working memory which stores data calculated by each of the processor cores 11A to 11C and the vehicle information described above.

The 2D rendering unit 18 is a functional block which renders an image of two-dimensional vector graphics or raster graphics.

The 3D rendering unit 19 is a functional block which renders an image of three-dimensional computer graphics.

(Configuration of Power Supply Circuit)

Figure 2:
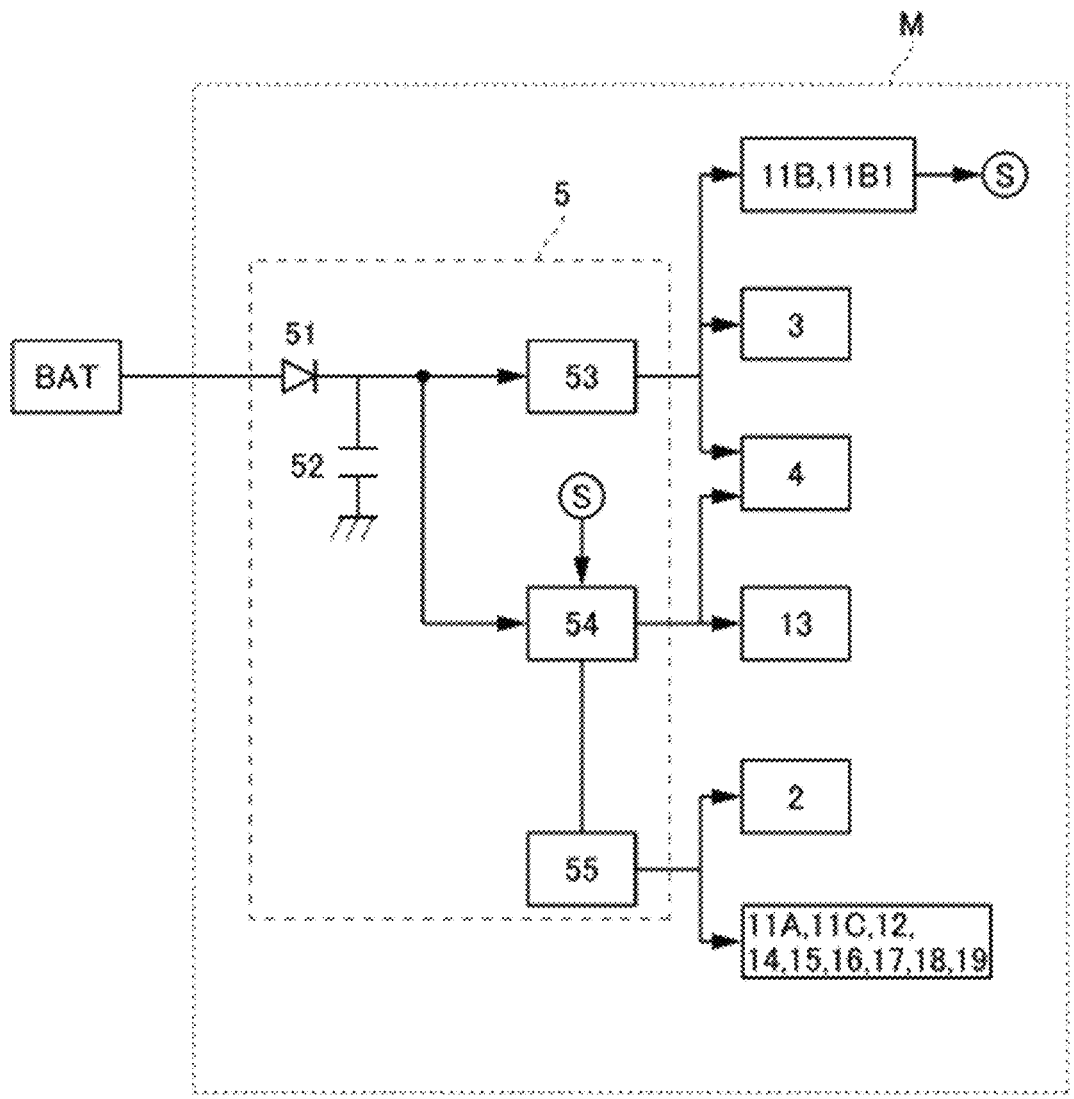
FIG. 2 is a diagram illustrating a power supply configuration of the vehicular display device.

As illustrated in FIG. 2, the power supply circuit 5 is provided with a diode 51, a capacitor 52, the first power supply circuit 54, a second power supply circuit 55, and the third power supply circuit 53.

The diode 51 is a backflow prevention diode which is provided in a power supply path formed from the vehicle-mounted battery BAT to each of the power supply circuits 53 to 55. That is, while the diode 51 allows power to be supplied from the vehicle-mounted battery BAT to each of the power supply circuits 53 to 55, the diode 51 prevents a current from flowing from each of the power supply circuits 53 to 55 toward the vehicle-mounted battery BAT.

The capacitor 52 is an instantaneous interruption prevention capacitor which is provided in the power supply path formed from the vehicle-mounted battery BAT to each of the power supply circuits 53 to 55. That is, the capacitor 52 discharges electricity that has been accumulated during the power supply when an instantaneous power interruption occurs, and maintains the power supplied state even at the time of the instantaneous power interruption.

The first power supply circuit 54 is a stabilized power supply circuit which steps down the battery power supplied from the vehicle-mounted battery BAT, and supplies the power to the communication unit 13 and the second power supply circuit 55. For example, the first power supply circuit 54 is a series regulator or a switching power supply circuit, and steps down the battery power to a voltage of 5.0 V and supplies the stepped-down voltage. Further, the power supplied from the first power supply circuit 54 is also input to the reset circuit 4 as a signal for use in reset determination.

The second power supply circuit 55 is a stabilized power supply circuit which steps down the 5V power supplied from the first power supply circuit 54, and supplies the power to the display 2 and the SOC 1 (more specifically, the constituent elements of the SOC 1 excluding the second processor core 11B and the communication unit 13). For example, the second power supply circuit 55 is a series regulator or a switching power supply circuit, and steps down the 5V power to a voltage of 3.3 V, 1.8 V, 0.8 V, or the like, and supplies the stepped-down voltage.

The third power supply circuit 53 is a stabilized power supply circuit which steps down the battery power and supplies the power to the second processor core 11B, the internal memory 11B1 (the in-core RAM), the timer unit 3, and the reset circuit 4. For example, the third power supply circuit 53 is a series regulator or a switching power supply circuit, and steps down the battery power to a voltage of 3.3 V or 1.8 V and supplies the stepped-down voltage.

The third power supply circuit 53 is an always-on power supply which constantly supplies power, and the first power supply circuit 54 and the second power supply circuit 55 are on/off power supplies which are capable of turning on or off the power supply. The power supply by the first power supply circuit 54 is turned on or off by the second processor core 11B. Further, the power supply by the second power supply circuit 55 is turned on or off in coordination with the turning on or off of the first power supply circuit 54 which supplies power to the second power supply circuit 55.

(Power Saving Mode)

When a traveling function of the vehicle is ended, the vehicular display device M is shifted to a power saving mode until the traveling function of the vehicle is started again. The switching to the power saving mode is controlled as the second processor core 11B outputs a control signal S to the first power supply circuit 54.

The second processor core 11B determines a start/end of the traveling function of the vehicle on the basis of the state of a starting switch included in the vehicle information acquired from the vehicle-mounted control unit E via the in-vehicle network N. The starting switch is an ignition switch (an ignition key) in the case of an engined car, and is a power switch in the case of an electric vehicle.

When the second processor core 11B determines that the traveling function of the vehicle is ended, the second processor core 11B causes a power output of the first power supply circuit 54 (including the second power supply circuit 55) to be stopped. As a result, the vehicular display device M is shifted to the power saving mode.

Further, when the second processor core 11B determines that the traveling function of the vehicle is started, the second processor core 11B causes the first power supply circuit 54 (including the second power supply circuit 55) to start outputting power. As a result, the vehicular display device M is shifted from the power saving mode to a normal operation mode.

When the vehicular display device M is placed in the power saving mode, power is no longer supplied to parts other than the components (the second processor core 11B, the internal memory 11B1, the timer unit 3, and the reset circuit 4) to which power is supplied from the third power supply circuit 53. Consequently, power consumption is reduced.

(Activation Processing of SOC)

In starting the traveling function of the vehicle, the reset circuit 4 activates the SOC 1. The reset circuit 4 monitors an output voltage of the first power supply circuit 54, and outputs a reset signal to the SOC 1 and activates the SOC 1 when the output voltage of the first power supply circuit 54 reaches a predetermined voltage (for example, 5 V) in response to a start of the power output of the first power supply circuit 54 caused by the second processor core 11B.

According to such activation processing of the SOC 1, the reset circuit 4 is operated on the basis of the output voltage of the first power supply circuit 54, which is higher than that of the second power supply circuit 55. Therefore, it is possible to activate the SOC 1 by appropriately operating the reset circuit 4 even when a voltage drop of the battery power occurs.

(Data Saving Processing)

When the vehicular display device M is placed in the power saving mode, the power supply to the RAM 17 is cut off, so that all the data held in RAM 17 will be lost. In the data held in the RAM 17, there exists vehicle information which needs to be continuously held (hereinafter referred to as save-required-data D as appropriate). These pieces of vehicle information are saved in another memory before the power supply to the RAM 17 is cut off. The save-required-data D includes, for example, a total travel distance (ODO), an elapsed time (for example, time elapsed from the previous maintenance), fuel efficiency, electricity efficiency, and a display screen parameter (for example, screen setting information and display screen information at an end of the traveling).

Conventionally, the data saving processing as such has been performed by writing the save-required-data D on the RAM 17 into the ROM 16. However, when the number of writes made to the ROM 16 by the data saving exceeds a guaranteed number of writes for the ROM 16, the possibility of the data not being able to be stored correctly increases. Therefore, there has been a demand for reducing the number of writes to be made in the data saving.

Figure 3:
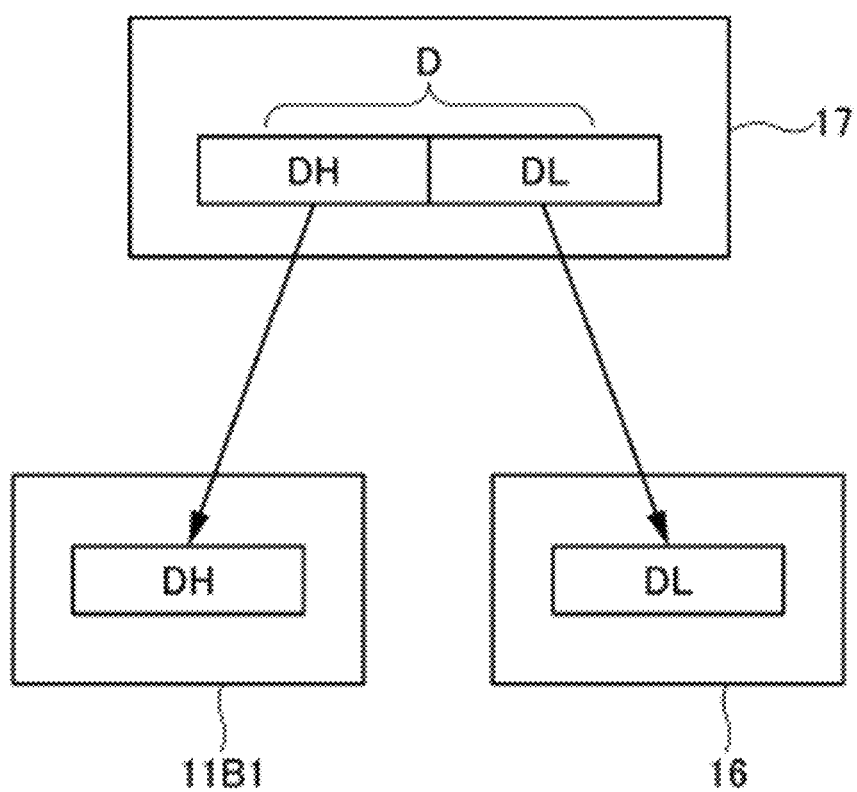
FIG. 3 is an explanatory diagram of data saving processing.

Hence, as illustrated in FIG. 3, the second processor core 11B of the SOC 1 performs the data saving processing of separating the save-required-data D on the RAM 17 to separately store the save-required-data D in the in-core RAM of the internal memory 11B1 and the ROM 16 before the vehicular display device M is shifted to the power saving mode. In particular, in the save-required-data D, high update frequency data DH whose frequency of update is high is saved in the in-core RAM of the internal memory 11B1, and low update frequency data DL whose frequency of update is low is saved in the ROM 16. According to the data saving processing as such, the number of writes to be made to the ROM 16 can be reduced as compared to saving all of the save-required-data D in the ROM 16.

For example, when the save-required-data D corresponds to the total travel distance, in the total travel distance, data representing a high-order digit (for example, a digit representing the part greater than or equal to 1 km) is set as the low update frequency data DL, and data representing a low-order digit (a digit representing the part less than 1 km) is set as the high update frequency data DH.

Further, when the save-required-data D corresponds to the elapsed time, in the elapsed time, month data, date data, and minute data are set as the low update frequency data DL, and second data is set as the high update frequency data DH.

Furthermore, when the save-required-data D corresponds to the fuel efficiency or electricity efficiency, in the fuel efficiency or electricity efficiency, data representing a high-order digit (for example, a digit representing the part greater than or equal to 1 km/L) is set as the low update frequency data DL, and data representing a low-order digit (a digit representing the part less than 1 km/L) is set as the high update frequency data DH.

Further, when the save-required-data D corresponds to the display screen parameter, in the display screen parameter, the screen setting information is set as the low update frequency data DL, and the display screen information at the end of the traveling is set as the high update frequency data DH.

An embodiment of the vehicular display device M of the present disclosure has been described above.

The vehicular display device M of the present disclosure is provided with the volatile RAM 17 which stores the vehicle information, and the SOC 1 which causes the vehicle information stored in the RAM 17 to be displayed on the display 2. Further, the vehicular display device M is provided with the ROM 16, which is nonvolatile, and the in-core RAM (included in the internal memory 11B1 of the second processor core 11B), which is volatile and whose capacity is smaller than that of the ROM 16.

Furthermore, the vehicular display device M is provided with the first power supply circuit 54 and the second power supply circuit 55 which supply power to the ROM 16, the RAM 17, and the display 2, and are capable of turning on or off the power supply thereto, and the third power supply circuit 53 which constantly supplies power to the in-core RAM. When a vehicle travel end operation is performed, the SOC 1 turns off the first power supply circuit 54 and the second power supply circuit 55 and performs the data saving processing before shifting to the power saving mode. In the data saving processing, a part of the vehicle information stored in the RAM 17 is separated to be separately stored in the ROM 16 and the in-core RAM as the save-required-data D (save vehicle information). As a result, the number of writes to be made to the ROM 16 can be reduced as compared to saving all of the save-required-data D in the ROM 16.

Further, in the data saving processing, the SOC 1 stores data whose frequency of update is low of the save-required-data D in the ROM 16, and stores data whose frequency of update is high of the save-required-data D in the in-core RAM. As a result, the data (the low update frequency data DL) to be stored in the ROM 16 and the data (the high update frequency data DH) to be stored in the in-core RAM are appropriately distributed, and the number of writes to be made to the ROM 16 can be more reliably reduced.

Further, the save-required-data D includes any one of the total travel distance, the elapsed time, the fuel efficiency, the electricity efficiency, and the display screen parameter. In the total travel distance, data representing a high-order digit is set as data of a low update frequency, and data representing a low-order digit is set as data of a high update frequency. Further, in the elapsed time, month data, date data, and minute data are set as data of a low update frequency, and second data is set as data of a high update frequency. Furthermore, in the fuel efficiency or electricity efficiency, data representing a high-order digit is set as data of a low update frequency, and data representing a low-order digit is set as data of a high update frequency. Furthermore, in the display screen parameter, the screen setting information is set as data of a low update frequency, and the display screen information at the end of the traveling is set as data of a high update frequency. As a result, the data (the low update frequency data DL) to be stored in the ROM 16 and the data (the high update frequency data DH) to be stored in the in-core RAM can be distinctly and appropriately distributed.

REFERENCE SIGNS LIST

M Vehicular display device
1 SOC (control unit)
11A First processor core
11B Second processor core
11B1 Internal memory (second save memory)
11C Third processor core
12 PVT monitoring unit
13 Communication unit
14 Video input unit
15 Display control unit
16 ROM (first save memory)
17 RAM (working memory)
18 2D rendering unit
19 3D rendering unit
2 Display
3 Timer unit
4 Reset circuit
5 Power supply circuit
51 Diode
52 Capacitor
53 Third power supply circuit (always-on power supply)
54 First power supply circuit (on/off power supply)
55 Second power supply circuit (on/off power supply)
BAT Vehicle-mounted battery
C Vehicle-mounted camera
E Vehicle-mounted control unit
N In-vehicle network

The invention claimed is:
1. A vehicular display device comprising:
a volatile working memory which stores vehicle information; and
a control unit which causes the vehicle information stored in the working memory to be displayed on a display,
the vehicular display device further comprising:
a nonvolatile first save memory;
a volatile second save memory whose capacity is smaller than a capacity of the first save memory;
an on/off power supply which supplies power to the first save memory, the working memory, and the display, and is capable of turning on or off the power supply thereto; and
an always-on power supply which constantly supplies power to the second save memory, wherein
when a vehicle travel end operation is performed, the control unit turns off the on/off power supply and performs data saving processing before shifting to a power saving mode, and
in the data saving processing, a part of the vehicle information stored in the working memory is separated to be separately stored in the first save memory and the second save memory as save vehicle information.

2. The vehicular display device according to claim 1, wherein in the data saving processing, the control unit:
causes data whose frequency of update is low of the save vehicle information to be stored in the first save memory; and
causes data whose frequency of update is high of the save vehicle information to be stored in the second save memory.

3. The vehicular display device according to claim 2, wherein:
the save vehicle information includes any one of a total travel distance, an elapsed time, fuel efficiency, electricity efficiency, and a display screen parameter;
in the total travel distance, data representing a high-order digit is set as data of a low update frequency, and data representing a low-order digit is set as data of a high update frequency;
in the elapsed time, month data, date data, and minute data are set as data of a low update frequency, and second data is set as data of a high update frequency;
in the fuel efficiency or electricity efficiency, data representing a high-order digit is set as data of a low update frequency, and data representing a low-order digit is set as data of a high update frequency; and
in the display screen parameter, screen setting information is set as data of a low update frequency, and display screen information at an end of traveling is set as data of a high update frequency.

* * * * *